Patented Oct. 1, 1946

2,408,396

UNITED STATES PATENT OFFICE 2,408,396

PROCESS FOR ACTIVATING CATALYSTS

George Frederick Horsley, Norton-on-Tees, England, assignor to Imperial Chemical Industries Limited, a corporation of Great Britain No Drawing. Application May 8, 1944, Serial No. 534,694. In Great Britain April 29, 1943

11 Claims. (Cl. 252—239)

This invention relates to the activation of platinum-containing catalysts suitable for the oxidation of sulphur dioxide to sulphur trioxide.

In the production of sulphur trioxide by the oxidation of sulphur dioxide with oxygen or oxygen-containing gases in the presence of a catalyst containing platinum, deactivation of the catalyst can occur for example due to exposure to excessively high temperatures resulting from irregular operation of the plant, or due to poisoning, for example by compounds of arsenic. Also the initial activity of platinum-containing catalysts may be low due to faulty preparation and handling.

The present invention provides a process whereby not only can deactivated platinum-containing catalysts be reactivated but by means of which the activity of catalysts prepared by the usual methods and having normal or poor activity can be improved.

According to the present invention platinum-containing catalysts suitable for the oxidation of sulphur dioxide to sulphur trioxide are activated by treatment with an aqueous solution obtained by the interaction of sulphur dioxide and metallic iron in the presence of water.

The aqueous solution suitable for use according to the present invention may be prepared by placing water and metallic iron, for example, in the form of iron nails, in a suitable container and passing gaseous sulphur dioxide into the mixture. After stopping the stream of sulphur dioxide, the aqueous solution may be decanted from residual metallic iron before use. Alternatively, the metallic iron may be treated with an aqueous solution of sulphur dioxide. During the preparation of the solutions it is desirable to keep them cool, that is at a temperature not above 20° C. and preferably in the region of 0° C. In order to obtain the maximum increase in the activity of a given catalyst, the solution should be used as soon as possible after its preparation, and kept cool during the reactivation treatment. After treatment with the solution and separation from any residual iron the catalyst is washed with water and dried by cautious heating.

Instead of preparing the activating solution separately and using it as hereinbefore described, it has been found preferable to produce the solution in situ. Thus the metallic iron may be mixed with the catalyst to be activated and the mixture treated with an aqueous solution containing sulphur dioxide or with gaseous sulphur dioxide in the presence of water. During such treatment it is preferable to keep the mixture cool, for example, at a temperature not above 20° C. and preferably near 0° C.

If desired direct contact between the metallic iron and the catalyst may be avoided for example by placing the metallic iron in a suitable vessel and separated from the catalyst to be activated by means of a partition through which liquid can pass: for example, the partition may be constructed of gauze, perforated plate, porous earthenware or refractory material. It should be understood that such materials should be substantially inert under the conditions of reactivation. Alternatively, the metallic iron may be placed in a container through the walls of which liquid can pass, this container then being placed in a vessel containing the catalyst. In both cases an aqueous solution of sulphur dioxide may then be introduced into the vessel, or water may be placed in it and gaseous sulphur dioxide passed through.

As a further feature of the present invention, it has been found that even better activation can be obtained if the catalyst is given a preliminary treatment with nitric acid. A dilute solution, for example, one containing 10% by weight of nitric acid, is satisfactory. The nitric acid may be used warm. The preliminary treatment may be followed by a washing of the catalyst with water before the treatment with the aqueous solution obtained by the interaction of sulphur dioxide and metallic iron in the presence of water. The treatment with the aqueous solution obtained by the interaction of sulphur dioxide and metallic iron in the presence of water with or without a preliminary treatment with nitric acid, may be repeated one or more times.

We have found the process of this invention particularly suitable for the treatment of catalysts containing platinum supported on silica gel.

Example 1

A dry gaseous mixture containing 6% by volume of sulphur dioxide and 94% by volume of air was passed at a rate of 100 litres per hour over 43 gms. of a deactivated silica gel catalyst containing 0.8% by weight of platinum, the inlet gas temperature being maintained at 380° C. The conversion of sulphur dioxide to sulphur trioxide was found to be 72.7%.

Compared with this a sample of the same deactivated catalyst was mixed with iron nails and treated with a saturated aqueous solution of sulphur dioxide for 30 minutes at room temperature. After washing the mixture of catalyst and iron nails with water, removing the iron nails and drying the catalyst in a porcelain dish, the catalyst was used exactly as above described when the conversion of sulphur dioxide to sulphur trioxide was found to be 85%.

Example 2

A sample of the same deactivated catalyst as used in Example 1 was digested for 50 minutes in a cold nitric acid solution containing 10% by weight of nitric acid, washed with water, mixed with iron nails and treated with a saturated aqueous solution of sulphur dioxide for 30 minutes at room temperature. After washing with water, removing the iron nails and drying as above described, the catalyst was used under the same conditions as in Example 1, when the conversion of sulphur dioxide to sulphur trioxide was found to be 88%.

By repeating the treatment used in this example, it was found that a conversion of sulphur dioxide to sulphur trioxide of 92% was obtained.

Example 3

A dry gaseous mixture containing 6% by volume of sulphur dioxide and 94% by volume of air was passed over a silica gel catalyst containing 0.3% by weight of platinum at a rate of 100 litres per hour per 36 gms., the inlet gas temperature being maintained at 380° C. The conversion of sulphur dioxide to sulphur trioxide was 62%. After activation of this catalyst as described in Example 1, the conversion rose to 82%.

Hydrogen containing a little arsine was then passed over the catalyst which was maintained at 400° C., after which the catalyst was used for the production of sulphur trioxide under the same conditions as before the poisoning with arsenic.

It was then found that the conversion had fallen to 76%. After reactivation under the same conditions as in Example 1, the catalyst was again used for the conversion of sulphur dioxide to sulphur trioxide, as above described.

The conversion was found to be 82%.

Example 4

A dry gaseous mixture containing 6% by volume of sulphur dioxide and 94% by volume of air was passed at a rate of 100 litres per hour over 36 gms. of a silica gel catalyst containing 0.3% by weight of platinum, the inlet gas temperature being maintained at 390° C. The conversion of sulphur dioxide to sulphur trioxide was found to be 67%.

After treating the catalyst once as described in Example 2, the conversion under the same conditions as before the treatment was 81%.

After repeating the treatment twice the conversion was 87% under the same operating conditions.

Example 5

A sample of the same catalyst as that used in Example 4 was treated as follows:

The catalyst was digested for 30 minutes in cold 10% nitric acid, and then washed in running water for 10 minutes. Meanwhile, sulphur dioxide was passed into ice-water to which iron nails had been added the temperature being maintained at about 5° C. by means of ice. The orange coloured solution was decanted from the iron nails into another vessel which was cooled with ice. The catalyst was added, the vessel was covered to check oxidation and left to stand with occasional shaking for one hour. Then the catalyst was separated from the liquid by filtration, washed in running water for 10 minutes, and afterwards dried.

After this treatment the catalyst was tested under the same conditions as in Example 4 and the conversion of sulphur dioxide to sulphur trioxide was found to be 87%.

I claim:

1. A process for the activation of platinum-containing catalysts suitable for the oxidation of sulphur dioxide to sulphur trioxide comprising treating the catalyst with an aqueous solution prepared by the interaction of sulphur dioxide and metallic iron in the presence of water.

2. A process for the activation of platinum-containing catalysts suitable for the oxidation of sulphur dioxide to sulphur trioxide comprising interacting sulphur dioxide and metallic iron in the presence of water, removing residual iron from the solution and treating the catalyst with the solution.

3. A process for the activation of platinum-containing catalysts suitable for the oxidation of sulphur dioxide to sulphur trioxide which comprises interacting sulphur dioxide and metallic iron in the presence of water and the catalyst.

4. A process for the activation of platinum-containing catalysts suitable for the oxidation of sulphur dioxide to sulphur trioxide which comprises interacting sulphur dioxide and metallic iron in the presence of water at a temperature not exceeding 20° C., separating residual iron from the solution and treating the catalyst with the solution.

5. A process for the activation of platinum-containing catalysts suitable for the oxidation of sulphur dioxide to sulphur trioxide comprising treating the catalyst at a temperature not exceeding 20° C. with an aqueous solution prepared by the interaction of sulphur dioxide and metallic iron in the presence of water.

6. A process for the activation of platinum-containing catalysts suitable for the oxidation of sulphur dioxide to sulphur trioxide comprising interacting sulphur dioxide and metallic iron in the presence of water and the catalyst at a temperature not exceeding 20° C.

7. A process for the activation of platinum-containing catalysts suitable for the oxidation of sulphur dioxide to sulphur trioxide comprising treating the catalyst with nitric acid, washing the catalyst with water, and treating the catalyst with an aqueous solution obtained by interacting sulphur dioxide and metallic iron in the presence of water.

8. A process for the activation of platinum-containing catalysts suitable for the oxidation of sulphur dioxide to sulphur trioxide comprising treating the catalyst with nitric acid, washing with water and then treating the catalyst with an aqueous solution prepared by the interaction of sulphur dioxide and metallic iron in the presence of water at a temperature not exceeding 20° C.

9. A process for the activation of platinum-containing catalysts suitable for the oxidation of sulphur dioxide to sulphur trioxide comprising treating the catalyst with an aqueous solution obtained by the interaction of sulphur dioxide and metallic iron in the presence of water at a temperature in the region of 0° C.

10. A process for the activation of platinum-containing catalysts suitable for the oxidation of sulphur dioxide to sulphur trioxide comprising interacting sulphur dioxide and metallic iron in the presence of water and the catalyst at a temperature in the region of 0° C.

11. A process for the activation of platinum-containing catalysts suitable for the oxidation of sulphur dioxide to sulphur trioxide comprising treating the catalyst with nitric acid, washing with water and then treating the catalyst at a temperature in the region of 0° C. with an aqueous solution obtained by the interaction of sulphur dioxide and metallic iron in the presence of water at a temperature in the region of 0° C.

GEORGE FREDERICK HORSLEY.